Figure 1:
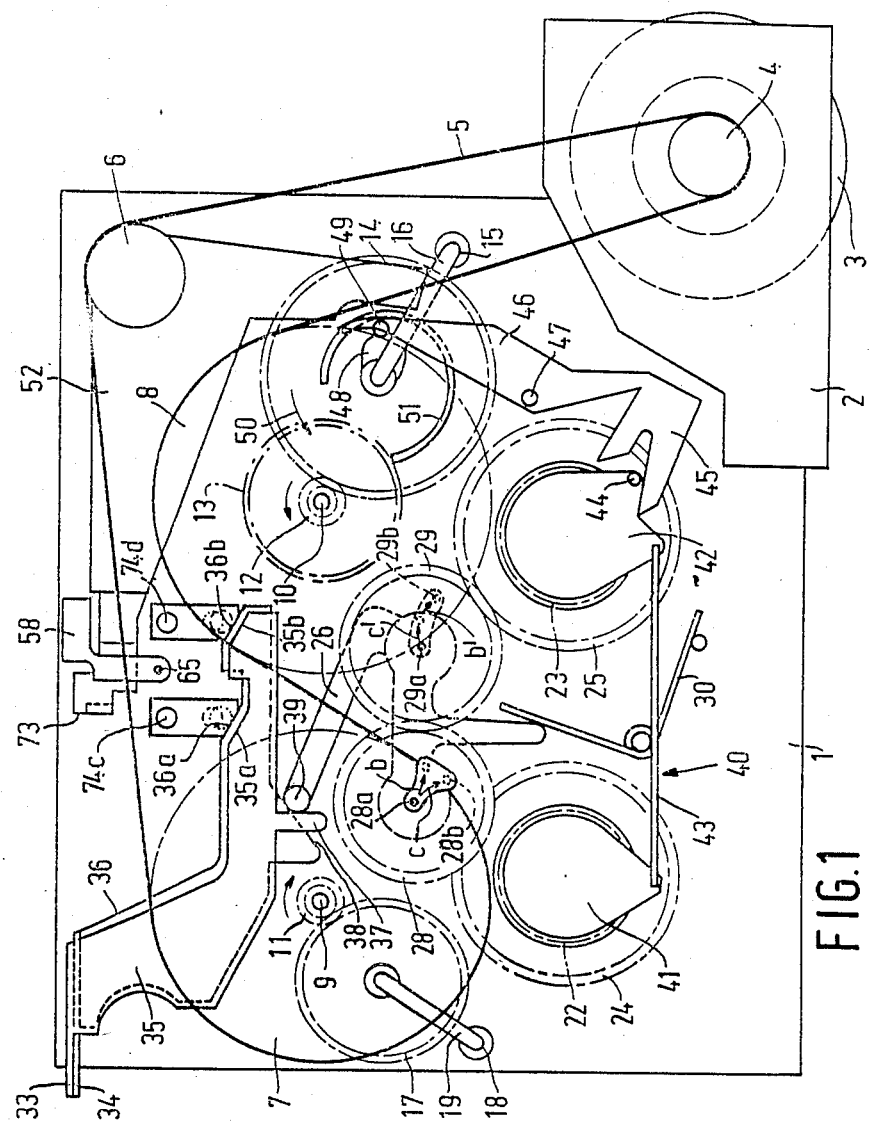

United States Patent [19]

Kommoss et al.

[11] Patent Number: 4,611,254
[45] Date of Patent: Sep. 9, 1986

[54] CONTROL MECHANISM FOR A MAGNETIC-TAPE-CASSETTE APPARATUS

[75] Inventors: Klaus Kommoss, Wetzlar-Naunheim; Karl Klös, Ruttershausen; Hans W. Dietz, Ehringshausen; Thomas H. W. Köppeler, Fronhausen, all of Fed. Rep. of Germany

[73] Assignee: U.S. Philips Corporation, New York, N.Y.

[21] Appl. No.: 657,645

[22] Filed: Oct. 4, 1984

[30] Foreign Application Priority Data

Oct. 14, 1983 [DE] Fed. Rep. of Germany ....... 3337359

[51] Int. Cl.$^4$ ............................................. G11B 15/10
[52] U.S. Cl. ........................................ 360/69; 360/71; 360/74.1
[58] Field of Search ........................... 360/69, 71, 74.1

[56] References Cited

PUBLICATIONS

Philips Technical Information, p. 65, Car Radio Tape Deck Soft-Touch, Sep. 1983, K. Klos.

Primary Examiner—George G. Stellar
Attorney, Agent, or Firm—Robert T. Mayer

[57] ABSTRACT

The invention relates to a control mechanism for a magnetic-tape-cassette apparatus, which mechanism comprises two adjacent axially movable actuating rods (33, 34) for switching two different operating modes of the apparatus. The command mechanism comprises a command member (250), which cooperates with a servo rod (260) which is axially reciprocable by means of a servo motor (22). The command member carries a command pin which engages a basically closed guideway (253) in which the pin can travel in one direction only. The guideway branches into a first (254) and a second command track (255) which the command pin can enter from the guideway. Drive portions (33a, 34a) of the actuating rods engage the command tracks. When it enters the first or the second command track the command pin shifts the relevant drive portion of the corresponding actuating rod so as to move this rod.

9 Claims, 11 Drawing Figures

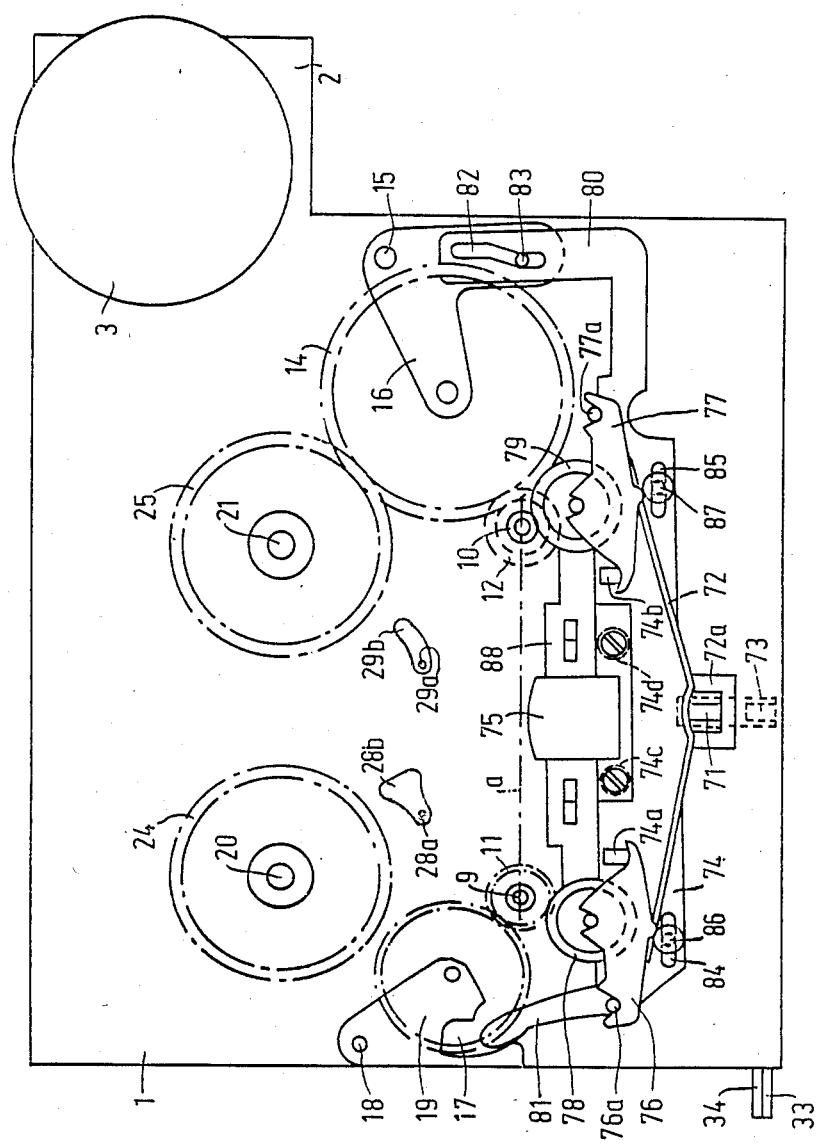

CONTROL MECHANISM FOR A MAGNETIC-TAPE-CASSETTE APPARATUS

The invention relates to a control mechanism for a magnetic-tape-cassette apparatus, which mechanism comprises two adjacent axially movable actuating rods for switching two different operating modes of the apparatus.

A magnetic-tape-cassette apparatus comprising two actuating rods for two operating functions is disclosed in U.S. Pat. No. 4,471,398. By means of the two actuating rods the apparatus can be set to, for example, the fast forward and fast reverse mode. The actuating rods are operated manually. As this demands a substantial effort and the actuating rods occupy a substantial amount of space in the apparatus, this is very undesirable.

It is the object of the invention to render such an apparatus with actuating rods suitable for use with an electrically operated servo-drive.

According to the invention this object is achieved with respect to the actuating rods in that
a command member acts on a servo rod which is axially reciprocable by means of a servo motor,
the command member carries a command pin which engages a basically closed guideway in which it can travel in one direction only,
the guideway branches into a first and a second command track which the command pin can enter from the guideway,
drive portions of the actuating rods engage the command tracks,
the command pin, as it enters the first or the second command track, drive the drive portion of the corresponding actuating rod so as to move said rod.

The advantage of such a servo-driven apparatus is that it can be derived from a standard mass-manufactured manually operated apparatus. An additional advantage of these servo-operated apparatus is that it can operate with a short travel of the servo rod, which results in faster switching. This not only facilitates the operation of, for example, a car cassette-player, but it also reduces the operating times. The short travel also results in less room being required for the movement of the servo rods upon actuation of the actuating rods.

In a further embodiment of the invention the command member is a connecting rod on whose end which is remote from the servo rod the command pin acts so as to be movable relative to the servo rod. Thus, the command pin can simply travel in the individual command tracks provided for this pin. Moreover, this movability provides some compensation for tolerances within the tape deck.

In a further embodiment of the invention the command tracks and the guideway are formed in a command block which is rigidly connected to the apparatus. The command block can then be manufactured in a simple manner, either separately or together with the apparatus chassis using the so-called "outsert moulding" technique.

In a further embodiment of the invention a reversing switch cooperates with the servo rod and is so arranged relative to the path of axial movement of said rod that the direction of rotation of the motor is reversed by actuation of the switch only when the command pin has reached such a location in the guideway that it must travel through the guideway in always the same predetermined direction, so that the command pin cannot enter a wrong command track. Obviously, the reversing switch may also be used for other functions of the apparatus in combination with the servo rod. For example, the reversing switch may be used for influencing the play mode in that it keeps the servo rod in its position corresponding to the play mode.

In a further embodiment of the invention the guideway comprises a starting portion for the command pin, from which starting portion the command pin can enter the first command track directly or the second command track via the other portion of the guideway. The starting portion provides the possibility of guiding the command pin always into the appropriate command track dictated by the microprocessor and the selected touch controls. In the starting portion the servo rod may switch a second tape-deck function which is terminated upon entry into the command tracks.

In a further embodiment of the invention
the guideway branches into a third command track which is disposed in line with the path of movement of the servo rod,
the reversing switch is rendered inoperative by means of an electrical control circuit when the command pin enters the third command track.

In this way the actuating rod can perform, for example, a further function without this movement being impeded by the command pin.

Figure 2A:
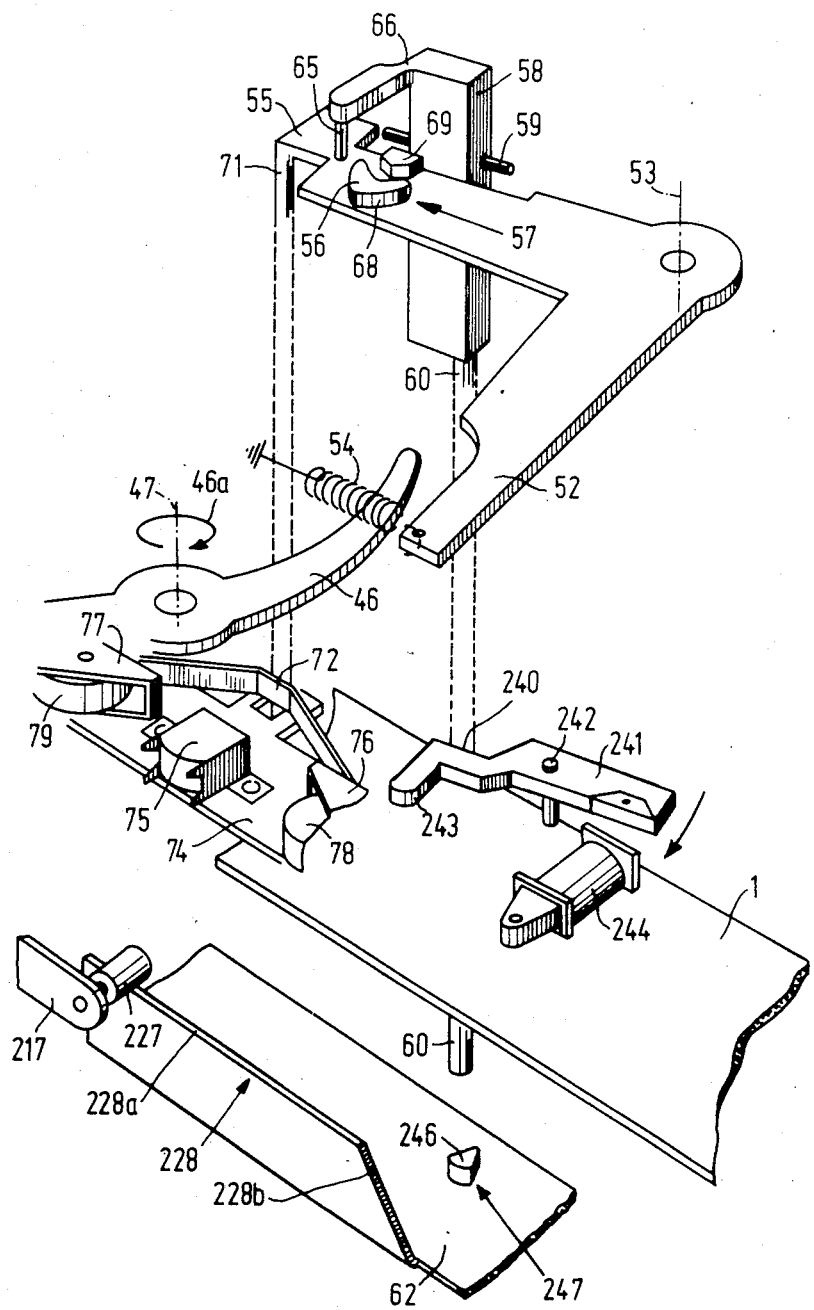
Figure 2B:
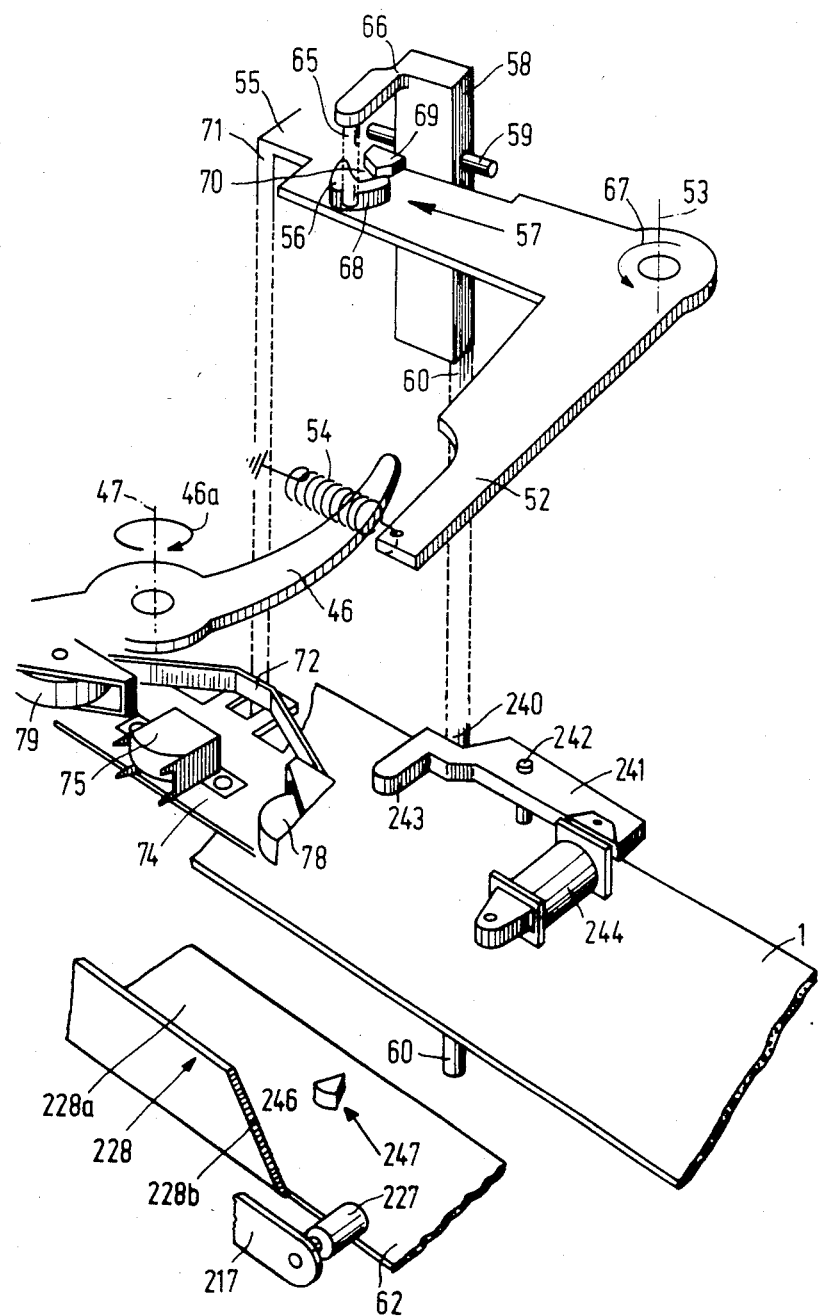
Figure 4:
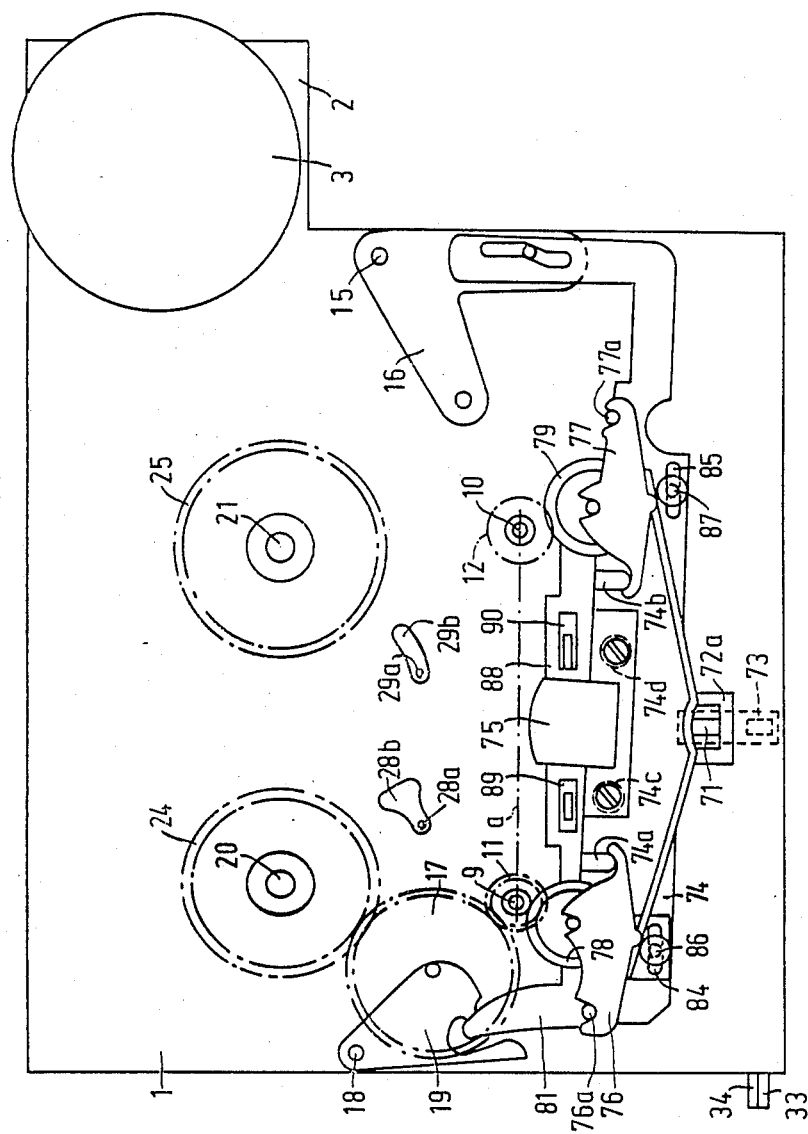
Figure 5:
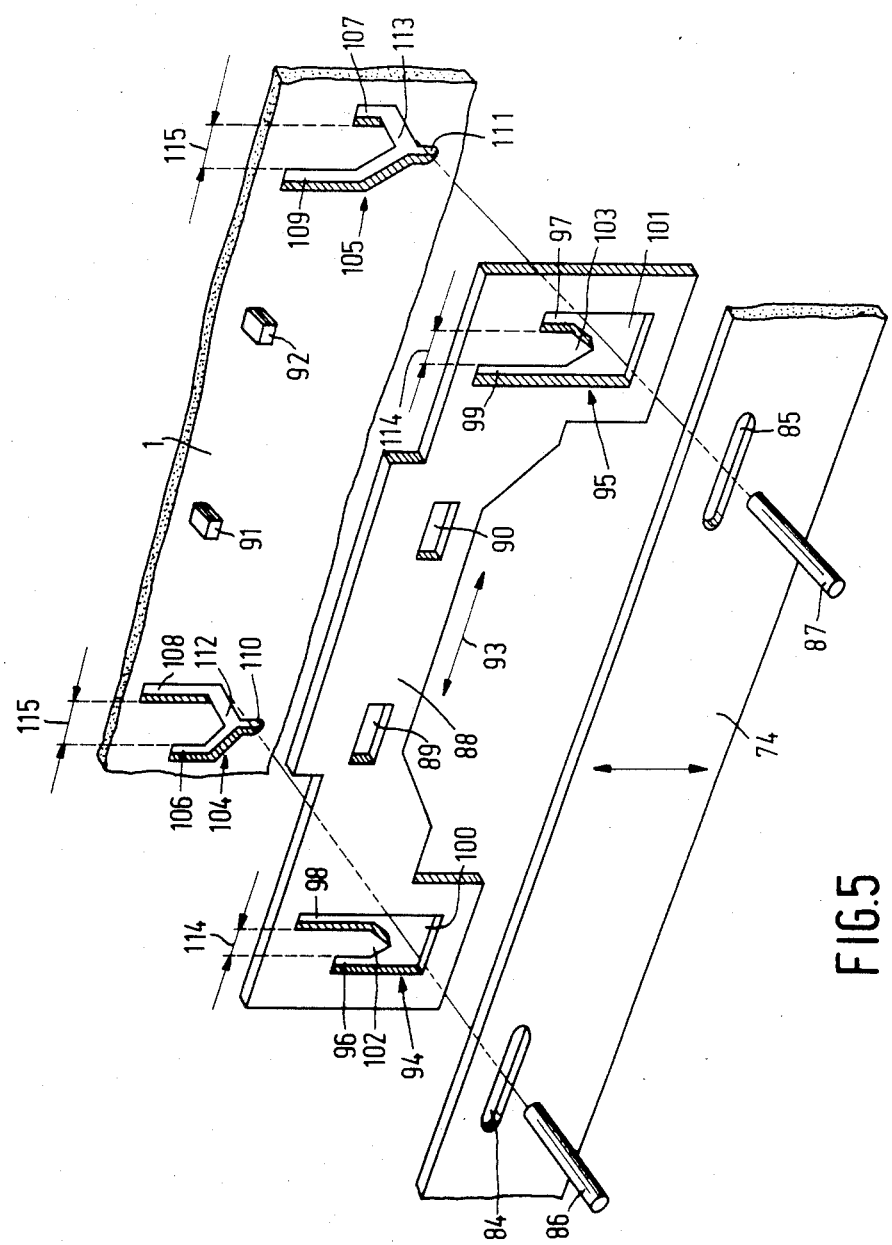
Figure 6:
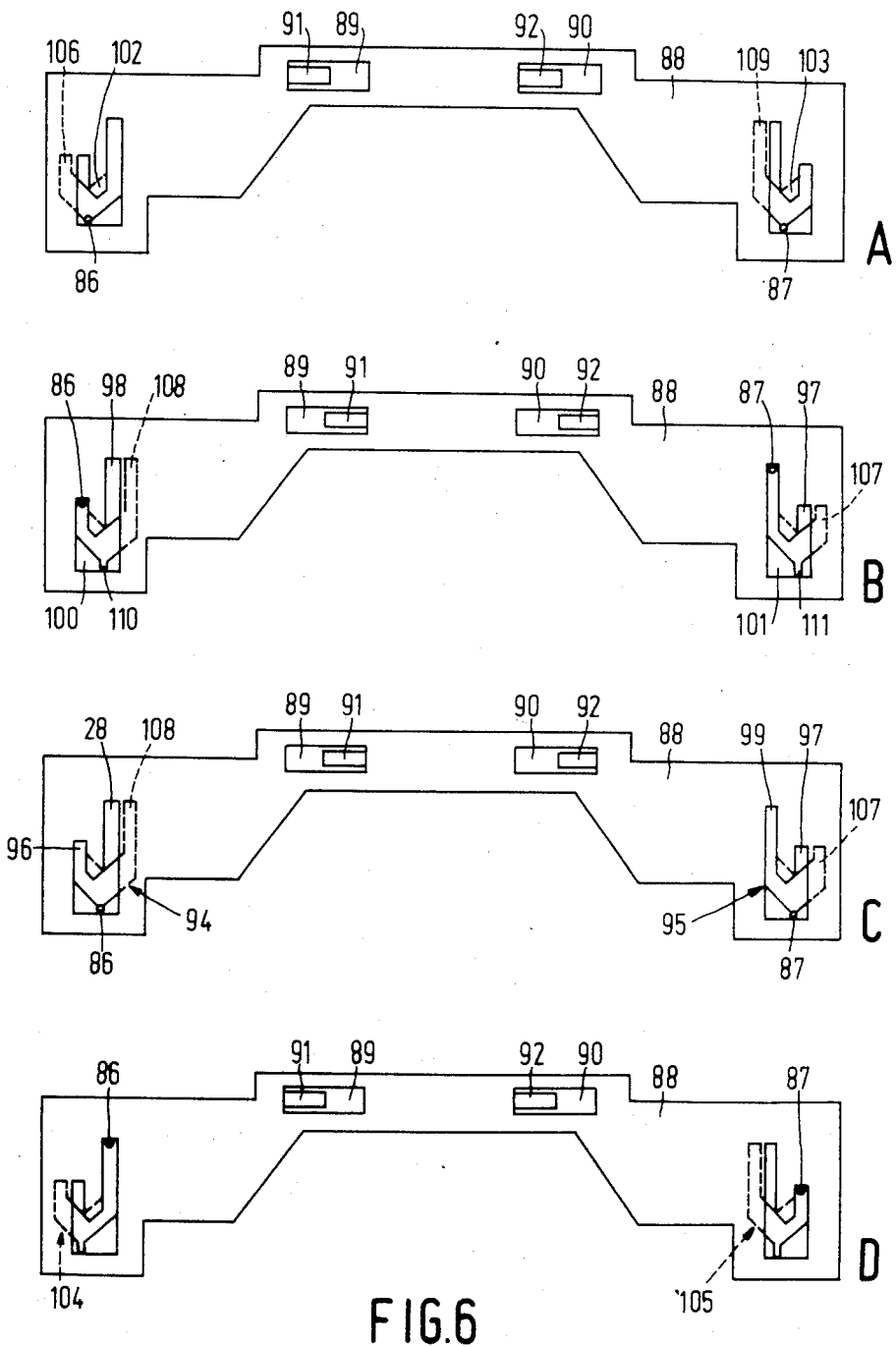
Figure 7:
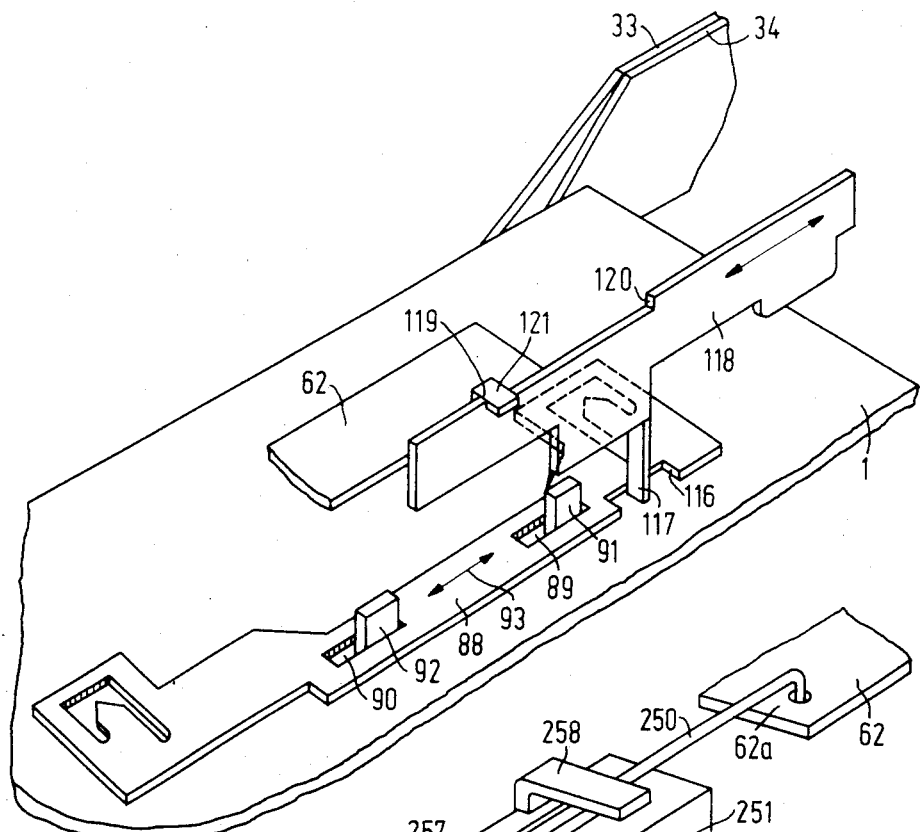
Figure 9A:
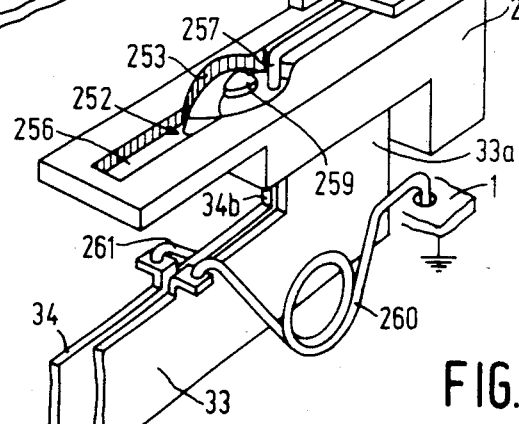
Figure 9B:
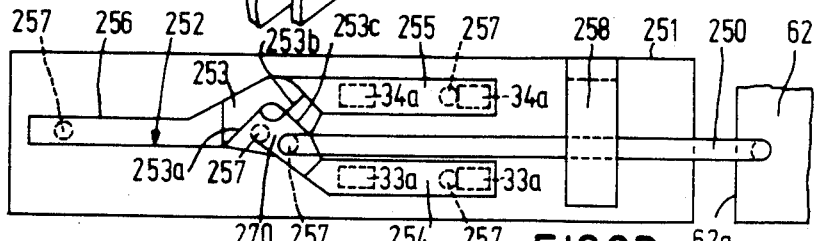
Figure 8:
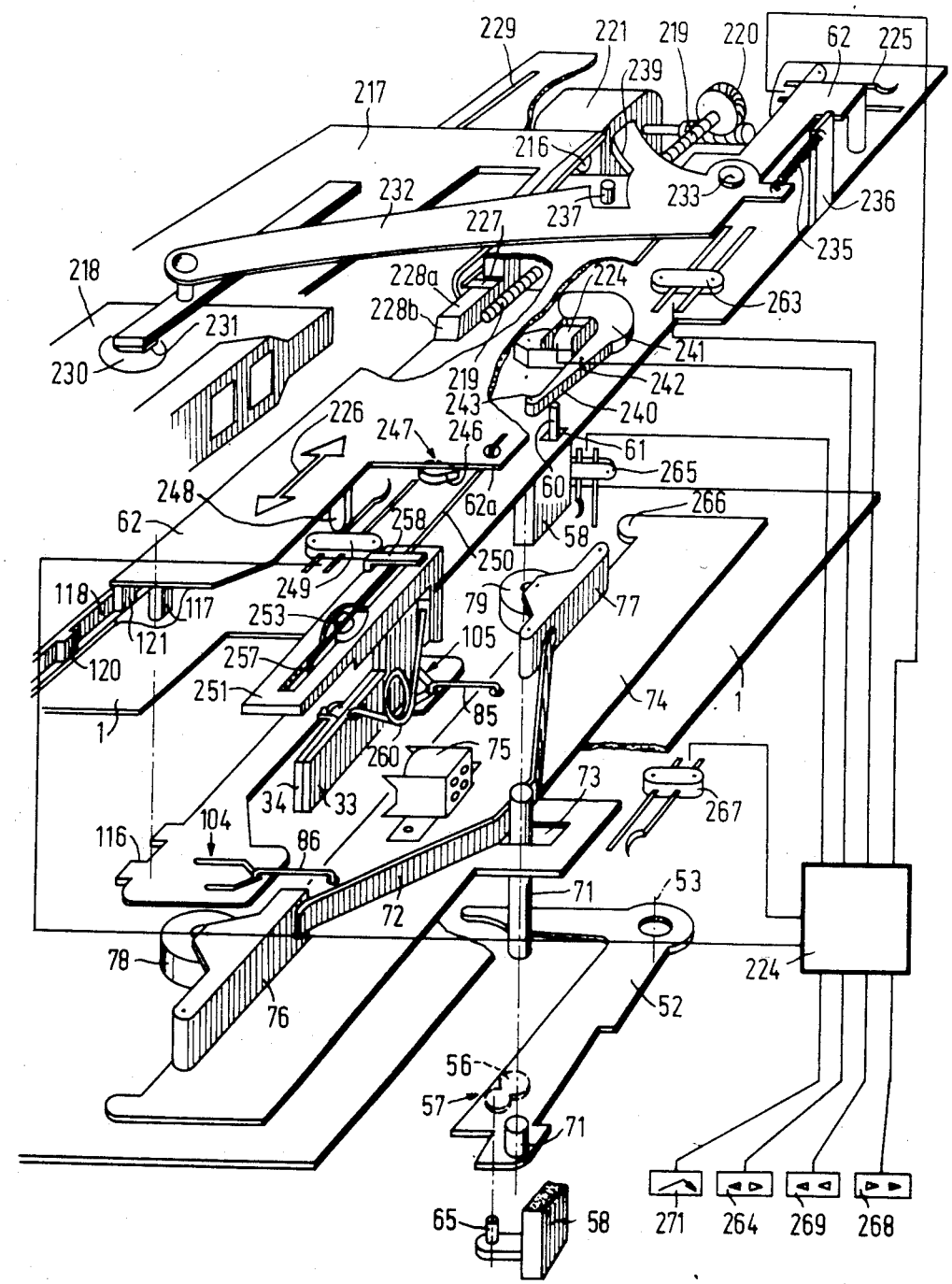

An embodiment of the invention will now be described in more detail, by way of example, with reference to the drawings. In the drawings:

FIG. 1 shows a part of a magnetic-tape-cassette apparatus comprising a control mechanism in accordance with the invention, FIG. 2A shows on an enlarged scale a latching mechanism of the apparatus shown in FIG. 1 in a first position, FIG. 2B shows the latching mechanism of FIG. 2A in a second position, FIG. 3 shows some parts of the apparatus of FIG. 1 viewed from the magnetic-head side in a first direction of tape transport, FIG. 4 shows some parts of the apparatus of FIG. 1 viewed from the magnetic-head side in a direction of tape transport opposite to that in FIG. 3, FIG. 5 is an exploded view illustrating the cooperation of a guide-slot system of the apparatus shown in FIG. 1 and control means for switching over the direction of tape transport and the head-mounting plate, FIG. 6, consisting of FIGS. 6A–6D, shows the various positions of a control plate for controlling the guide-slot system and the head-mounting plate shown in FIG. 5, FIG. 7 shows the control plate and a servo rod which cooperates with this plate to define a preferred direction of tape transport, FIG. 8 shows a control device comprising the servo rod in the apparatus as shown in the preceding Figures, further parts of the apparatus being shown schematically, FIG. 9A shows a command mechanism for the magnetic-tape-cassette apparatus, shown in the preceding Figures, FIG. 9B is a plan view of the command mechanism shown in FIG. 9A.

The magnetic-tape-cassette apparatus equipped with the mechanism in accordance with the invention and shown in FIG. 1 comprises a frame 1 which carries a unidirectional drive motor 3 by means of a support 2. A belt 5 is arranged on the drive pinion 4 of the motor 3 and along a guide roller 6 and flywheels 7 and 8 in such a way that the flywheels rotate in opposite directions. The flywheels 7 and 8 are journalled in the frame 1. The flywheel 7 is rigidly connected to a capstan 9 and the flywheel 8 is rigidly connected to a capstan 10. Further the flywheel 7 is connected to a gear wheel 11 and the flywheel 8 is connected to a gear wheel 12. Via a slipping clutch a further gear wheel 13, which is coaxial with the gear wheel 12, is mounted for rotation on the flywheel 8. A switching wheel 14 in the form of a gear wheel is constantly in mesh with the gear wheel 12 on the flywheel 8. This gear wheel 14 is pivotable about a spindle 15. The spindle 15 carries a pivotal arm 16, shown schematically in FIG. 1, on which arm 16 the switching wheel 14 is mounted for rotation. Similarly, a gear wheel 17 is constantly in mesh with the gear wheel 11. This gear wheel 17 is pivotable about a spindle 18 by means of a pivotal arm 19, which is shown schematically.

As is also shown in FIGS. 3 and 4 winding spindles 20 and 21 are mounted for rotation in the frame 1. These winding spindles 20 and 21 are rigidly connected to fast-wind wheels 22 and 23. Play wheels 25 and 24 are coupled to the winding spindles 20 and 21 respectively via slipping clutches.

FIG. 3 shows how the play wheel 25 is driven by the gear wheel 12 via the switching wheel 14. Similarly, FIG. 4 shows how the play wheel 24 is driven by the gear wheel 11 via the gear wheel 17.

A member 26, which is mounted in the frame 1 so as to be movable, carries two gear wheels 28 and 29 (see FIG. 1) disposed adjacent each other. A spring 30 urges the member 26 into an initial position as shown in FIG. 1.

The member 26 carries two pins 28a and 29a which are movable in a triangular hole 28b and a slot 29b, respectively in the frame 1.

For fast forward and reverse winding there are provided two adjacent axially movable actuating rods 33 and 34, which are connected to slides 35, 36. These slides 35 and 36 cooperate with the member 26. For this purpose the slide 35 is provided with a projection 37, the slide 36 being provided with an associated oblique surface 38. The projection 37 and the oblique surface 38 act on a pin 39 on the member 26. Further, the slides 35 and 36 are provided with oblique surfaces 35a, 35b and 36a, 36b respectively, which can cooperate with pins 74c, 74d on a head-mounting plate 74 (see also FIGS. 3 and 4).

If, as will be described with reference to FIG. 9, the projection 37 is urged against the pin 39 on the member 26 when the actuating rod 33 is pressed inwards, the gear wheel 29 will mesh with the gear wheel 13. The pin 28a then moves in a direction indicated by the arrow b and the pin 29a is moved in the direction indicated by the arrow c'. As the movement continues, the pin 29a moves further in the direction indicated by the arrow b' and the gear wheel 29 also comes into mesh with the gear wheel 23. Now the magnetic tape is wound rapidly by means of the winding spindle 21. If, as will be described with reference to FIG. 9, the other actuating rod 33 is pressed inwards, the oblique surface 38 will cooperate with the pin 39 on the member 26, so that the pin 28a is moved in the direction indicated by the arrow c and the pin 29a is moved in the direction indicated by the arrow c', so that the gear wheel 29 meshes with the gear wheel 13 and the gear wheel 28 meshes with the gear wheel 22. As a result of this, the other winding spindle 20 is driven for fast winding.

When the head-mounting plate 74 has reached a play position the pins 74c and 74d will occupy one of the positions as shown by the broken lines in FIG. 1. These positions correspond to the positions shown in FIGS. 3 and 4, respectively. By pressing the actuating rod 33 or 34 inwards the pins 74c and 74d, and hence the head-mounting plate 74, are moved to the left via the oblique surfaces 35a, 35b and 36a, 36b respectively, so that a magnetic head 75 and the pressure rollers 78 and 79 are lifted off the magnetic tape.

A detection means 40 (FIG. 1), comprising two discs 41 and 42 and a connecting rod 43, is coupled to the winding spindles 20 and 21 via slipping clutches. The disc 42 carries a pin 44 which is situated within a switching fork 45. The switching fork 45 is arranged on a switching element 46 which is pivotable about a pivot 47 (see also FIGS. 2A and 2B). In its centre the switching wheel 14 carries a substantially elliptical projection 48. The switching element 46 extends across the switching wheel 14 and carries a pin 49, which can move around the projection 48 when the switching element 46 has been pivoted inwards and the switching wheel rotates in the direction indicated by an arrow 50. A spiral guide track 51 surrounds and is spaced from the projection 48 on the switching wheel 14. This guide track 51 can cooperate with the pin 49 on the switching element 46, namely when the detection means detects tape stoppage. The pin 44 then no longer acts against the switching fork 45, so that the pin 49 on the switching element 46 is no longer urged inwards towards the projection 48 but remains in the same position and, as the switching wheel is rotated further in the direction indicated by the arrow 50, it reaches the outer side wall of the guide track 51. Since the guide track 51 is spiral-shaped the switching element 46 is pivoted clockwise (arrow 46a in FIGS. 2A and 2B) about its pivot 47, so that the switching elements 46 is urged against a connecting element 52.

The connecting element 52 is a bifurcate lever which is pivotable about a pivot 53. As can be seen in FIGS. 2A and 2B, the connecting element 52 is urged in the clockwise direction by a spring 54. In this way the spring 54 is tensioned by the movement of the switching element 46.

The lever arm 55 of the connecting element 52 which is remote from the point of contact with the switching element 46 carries a heart-shaped projection 56 which forms part of a latching mechanism 57. The latching mechanism 57 also comprises a latching lever 58 which is pivotable about a spindle 59. The spindle 59 extends parallel to the surface of the frame 1 and to an imaginary connecting line a (FIGS. 3 and 4) between the capstans 9 and 10. On the side facing the heart-shaped projection 56 the latching lever 58 carries a guide pin 60 which extends through a hole 61 (FIG. 8) in chassis 1. The movement of the latching lever about the spindle 59 will be explained later with reference to FIG. 8.

The latching lever 58 carries a latching pin 65 (FIG. 2A) which can engage with and travel around the heart-shaped projection. This last-mentioned possibility is achieved by means of, for example, an integral hinge 66. In FIG. 2A the pin 65 is situated above the heart-shaped projection 56. In FIG. 2B the pin 65 has engaged with the projection 56. Thus, the pin 65 can cooperate with the projection 56 if the switching element 46 pivots the connecting element 52, as is shown in FIG. 2B, in the anticlockwise direction indicated by the arrow 67. During this pivotal movement the pin 65 has moved along a side wall 68 of the projection 56. A guide 69 ensures that the pin 65 engages a recess 70 in the heart-shaped projection 56.

The lever arm 55 carries a limb 71. As can be seen in FIG. 8, this limb 71 cooperates with a blade spring 72 and extends through a slot 73 in the frame 1. The free ends of the blade spring 72 act against abutments 76 and 77 on the head-mounting plate 74. In its centre this head-mounting plate 74 carries the magnetic head 75 and on each side of the head 75 the abutments 76 and 77 in which the pressure rollers 78 and 79 are journalled. The abutments are urged against stops 74a and 74b (FIGS. 3 and 4) on the head-mounting plate 74. The head-mounting plate 74 has angular end portions 80 and 81. The angular end portion 80 has a slot 82 which is engageable by a pin 83 mounted on the pivotal arm 16. In the position shown in FIG. 3 the pivotal arm 16 has pivoted about the spindle 15 in such a way that the switching wheel 14 is in mesh with the play wheel 25 and the gear wheel 12. Similarly FIG. 4 shows that the angular end portion 81 of the head-mounting plate 74 has pivoted the pivotal arm 19 about the spindle 18, so that the gear wheel 17 is in mesh with the play wheel 24 and the gear wheel 11. In the same way, in the position shown in FIG. 3, the pressure roller 79 is applied to the capstan 10, whilst in the position shown in FIG. 4 the pressure roller 78 is applied to the capstan 9. The head-mounting plate 74 has slots 84 and 85 which extend parallel to the connecting line a between the capstans 9 and 10 and in which guide pins 87 and 88 can move.

The exploded view in FIG. 5 shows guide pins 86 and 87 guided in the slots 84 and 85 in the head-mounting plate 74. In this way the guide pins are movable parallel to the connecting line a (FIGS. 3 and 4) between the capstans. The drawings do not show how the guide pins 86 and 87 are retained in the head-mounting plate 74. A simple construction is to secure the guide pins to caps in the same way as the pins of thumbtacks. However, it is alternatively possible to mount the guide pins on the free ends of resilient tongues which are secured to the head-mounting plate 74.

A control plate 88 (FIG. 5) which functions as a control means is arranged between the head-mounting plate 74 and the chassis plate on the upper side of the frame 1. This control plate 88 is formed with slots 89 and 90 through which projections 91 and 92 on the chassis plate extend. As a result of this, the control plate 88 is movable parallel to the imaginary connecting line a between the capstans 9 and 10. This is indicated by a double-headed arrow 93 in FIG. 5.

Both end portions of the control plate 88 are formed with U-shaped slots 94 and 95. The U-shaped slots 94 and 95 each have a short branch 96, 97 and a long branch 98, 99. The short branches are situated at greater distances from each other than the long branches. The connecting portions 100 and 101 between the short and long branches are substantially wider than the branches. Between the long and short branches tongues 102 and 103 are formed, of which the end portions which face the connecting portions 100, 101 are pointed.

In the chassis plate of the frame 1 bifurcate guide slots 104 and 105 are formed which serve as guideslot systems and which each comprise two branches, each bifurcate slot having a short branch 106, 107 and a long branch 108, 109. Central run-in branches 110, 111 communicate with their respective short and long branches.

The distance 114 between the branches of the U-shaped guide slots 94, 95 in the control plate 88 is smaller than the distance 115 between the branches of the bifurcate guide slots 104, 105.

FIG. 7 shows the control plate 88 in a perspective view at the chassis plate of the frame 1. The control plate 88 is provided with a stop 116 which can abut with a projection 117 of an intermediate slide 118 which is movable parallel to the imaginary connecting line a between the capstans 9 and 10 (FIGS. 3 and 4). The intermediate slide 118 comprises two stop portions 119, 120 which can cooperate with a drive portion 121 of a servo rod 62 to be described hereinafter with reference to FIG. 8. If the rod 62 is moved to the right in order to eject a cassette, the rod moves the intermediate slide 118 to the right because the drive portion 121 has abutted with the stop 120. As a result of this the projection 117 abuts with the stop 116. Thus, the control plate 88 is moved to the right in the direction indicated by the double-headed arrow 93 in FIG. 7. However, if the rod 62 is moved to the left, the drive portion 121 abuts with the stop 119. As a result of this, the projection 117 becomes disengages from the stop 116 and the control plate 88 can move freely within the limits imposed by projections 91 and 92 described in the foregoing.

The servo mechanism shown in FIG. 8 includes servo-rod 62, which is axially movable in the frame 1 adjacent a cassette lift 217. The axial direction is the direction of insertion and ejection of a cassette 218. The servo rod 62 is moved by means of a threaded spindle 219. Via a worm gear 220 this threaded spindle is driven by a reversible servomotor 221. This motor is controlled by a control circuit 224 such as a microprocessor. A switch 225 on the frame 1 limits the travel of the servo rod 62 in one direction. The switch 225 defines the end position of the servo rod 62 in the direction indicated by the top of double-headed arrow 226, which position can be detected by the switching device 224, the travels of all the actuating rods being referred to this position.

The lift 217, which is pivotable about a spindle 216, is vertically guided by a pin 227 which cooperates with a surface 228 on the servo rod 62. By means of a torsion spring 229, which is connected to the frame, the pin 227 is urged against the surface 228. A first portion 228a of the surface 228 extends parallel to the chassis 1 and changes to a downwardly inclined end portion 228b.

A drive portion 231 engages a winding-spindle hole 230 of the cassette 218 when the cassette has been inserted up to this drive portion. In this latched position the cassette projects about 30 mm from the apparatus. The drive portion 231 is pivotally connected to an ejector 232 which is mounted so as to be pivotable about a spindle 233 on the chassis 1. By means of a tension spring 235 the ejector 232 is tensioned relative to a hook 236 on the frame 1. The servo rod 62 carries a pin 237. Via a guide portion 239 the pin 237 can pivot the ejector 232 against the action of the tension spring 235.

The pin 60 of the latching lever 58 extends through the hole 61 in the chassis 1 and is situated against an edge 240 on the latching lever 241 (FIGS. 2A and 2B). The latching lever 241 is pivotable about a spindle 242. As a result of the connecting element 52 (FIGS. 3 and 4) with the spring 54 the lever 58 tends to pivot the latching lever 241 away from a latching magnet 244. A projection 243 on the latching lever 241 can cooperate with element 247 on the servo rod 62. The magnet 244 is electrically connected to the control circuit 224. The surface 246 forms part of element 247 which is integral with the servo rod 62. When the servo rod 62 is moved the surface 246 can cooperate with the projection 243 of the latching lever 241 to move the latching lever in such a way that it is applied to the latching magnet 244. At the same time an adjustable projection 248 cooperates with a play and reversing switch 249. If the projection 248 moves past the switch 249 this normally closed switch opens briefly after which it closes again.

A command element 250 in the form of a connecting rod cooperates with the servo rod 62 near an axial end portion 62a of this rod. The connecting rod comprises a bent portion which is pivotally suspended in a hole in the servo rod 62. The connecting rod 250 extends up to a command block 251. In this command block a guideway 252 (FIGS. 9A and 9B) is formed. This guideway 252 comprises a basically closed guideway 253 which is always passed through in the same direction, a first command track 254, a second command track 255, and a third command track 256. A bent end portion of the connecting rod 250, which portion has the form of a command pin 257, is engageable with these tracks. The command tracks 254 and 255 are formed as throughgoing parallel slots which are engageable by command pin 257 from the upper side and which are engageable by the drive portions 33a and 34a of the actuating rods 33 and 34 from the lower side. By means of a hold-down member 258 the command pin 257 is elastically urged into the tracks. The guideway 253 comprises a recess surrounding a central portion 259 in the command block 251. The bottom of the guideway 253 is formed with portions 253a, 253b and 253c. These portions ensure that the command pin 257 can travel in the guideway 253 in the clockwise direction only and not in the anti-clockwise direction. Springs 260 and 261 urge the actuating rods 33 and 34 in FIG. 9A to the left after release by the command pin 257. The drive portions 33a, 34a are thus part of a control mechanism, which also comprises the command element 250 and the command block 251.

The device operates as follows. If a cassette is inserted further over a length of approximately 10 mm from the latched position described above, the ejector 232 closes the switch 263, see FIG. 8. As a result of this, the motor 221 is started and the microprocessor 224 is electrically connected. The servo rod 62 is moved to the right in FIG. 8 and moves further to the right up to the reset switch 225. During this movement of the servo rod the lift 217 is lowered via the surfaces 228a, 228b (FIGS. 2A and 2B). As a result of the closure of the reset switch 225 the microprocessor 224 is set to an initial state. The direction of rotation of the servo motor 221 is then reversed so that the servo rod 62 is moved to the left. The projection 248 then moves past the play-reverse switch 249, so that the switch is opened and the servo-motor is switched off and the servo-rod movement stops. Now the tape-deck motor 3 is started. The surface 246 has then abutted with the projection 243 but the latching lever 241 is not applied to the magnet 244 because the magnet has not yet been energised by the circuit 224. As a result of this, the pin 65 (FIG. 2A) is not yet in engagement with the latching mechanism 57 and is not latched.

As the tape-deck motor 3 has started, the fly-wheels 7 and 8 rotate in opposite directions. The gear wheels 11 and 12 and the gear wheels 14 and 15, which are in mesh with these wheels, rotate also. The latching lever 58 has moved from the position shown in FIG. 2A to the position shown in FIG. 2B and the latching pin 65 reaches a position in which it can cooperate with the heart-shaped projection 56 shown in FIG. 2B.

As the gear wheels 14 and 17 are not in mesh with the gear wheels 24 and 25 the two winding spindles 20 and 21 (FIGS. 3 and 4) are not rotated. The discs 41 and 42 are coupled to the winding hubs 20 and 21 via separate friction clutches and therefore they do not rotate. As upon insertion of the cassette no torque is exerted on the switching element 46 because the hubs do not rotate and the tape is stationary, the switching element 46 remains in the position shown in FIG. 1 and the pin 49 reaches the outer side of the guide track 51. The switching element 46 now moves in the clockwise direction as indicated by the arrow 46a (FIG. 2A) and pivots the connecting element 52 in the anticlockwise direction (arrow 67, FIG. 2B). As the latching lever 58 has pivoted and the pin 65 can cooperate with the heart-shaped projection 56, the pin 65 now travels around the wall 68 of the projection 56 and engages the recess 70. Thus, the connecting element is latached in a pivotal position (see FIG. 2B).

Owing to the pivotal movement of the connecting element 52 in the anticlockwise direction indicated by the arrow 67, the projection 71 has moved inwards and is urged against the blade spring 72. The blade spring in its turn acts on the head-mounting plate 74 (FIGS. 3 and 4) via the abutments 76 and 77 and tends to move this plate towards the capstans 9 and 10. Now the presence of the control plate 88 will manifest itself.

Before the pivotal movement of the projection 71 the head-mounting plate 74 has moved away from the capstans. The guide pins 86 and 87 are then in engagement with the slots 110 and 111 (see FIG. 5). After ejection of the preceding cassette the control plate 88 occupies the position shown in FIG. 6C. When the head-mounting plate 74 is moved towards the capstans 9 and 10 the guide pins 86 and 87 move forward and abut with the right-hand sides of the tongues 102 and 103 to move into the right-hand branches 107 and 108 of the bifurcate guide slots 104 and 105. When the guide pins 86, 87 engage with the branches 107 and 108 these pins move the control plate 88 to the right, so that the branches 98, 108 and 97, 107 coincide with each other. The right-hand guide pin 87 then meets a stop in the short branch as the movement continues, while the left-hand guide pin 86 can move freely towards the capstan 9 (FIG. 6D). As a result of this, the left-hand side of the head-mounting plate 74 is moved forwards so that the left-hand pressure roller 78 (FIG. 4) is applied to the left-hand capstan 9. The other capstan remains free. The head-mounting plate 74 then occupies the position shown in FIG. 4 for a very short time.

As the pin 65 is not latched by the latching mechanism 57 the head-mounting plate is moved under the influence of the blade spring 72 and the spring 54 returns to the initial position. A switch 267 is then actuated to switch off the tape-deck motor 3. This process takes such a short time that it will not be noticed by the user. This is necessary because the movement of the control plate 88 shown in FIG. 6D would lead to the reverse-play position. However, when a cassette is inserted the deck must first be set to forward operation. This is achieved by means of the microprocessor 224 in that the servo motor 221 is started again and moves the servo rod 62 to the right up to the reset switch 225 and then back to the left until the latching lever 241 is applied to the latching magnet 244. Since the magnet 244 is now electrically energised the latching lever 241 remains in this position, so that the pin 65 can be latched by the latching mechanism 57. The play-reverse switch 249 is opened again by the projection 248, the servo rod 62 is stopped, and the tape-deck motor 3 is started again.

When the tape-deck motor 3 is started again, the control plate 88 is shifted. When the head-mounting plate 74 moves outwards the guide pins 86 and 87 engage the run-in branches 110 and 111. The control plate 88 has remained in its previous position. The tongues 102 and 103 are then still in a position which is offset to the right relative to the central position of the run-in branches 110 and 111 (FIG. 6A). When the tape-deck motor 3 is started again, the connecting element 52 is again pivoted anticlockwise by the switching element 46, so that the head-mounting plate 74 is moved forwards by means of the pin 71.

The control plate 88 occupies the position shown in FIG. 6A. When the head-mounting plate 74 is moved forwards towards the capstans 9 and 10 the guide pins 86 and 87 move forward and abut with the left-hand sides of the tongues 102 and 103 to engage the left-hand branches 106 and 109 of the bifurcate guide slots 104 and 105. When the guide pins 86 and 87 engage the branches 106 and 109 these guide pins 86 and 87 move the control plate 88 to the left, so that now the branches 96, 106 and 99, 109 coincide with each other. The left-hand guide pin 86 then meets a stop in the short branch during the forward movement, whilst the right-hand guide pin 87 can move freely towards the capstan 10 (FIG. 6B). The right-hand side of the head-mounting plate 74 is then moved forwards in such a way that the right-hand pressure roller 79 is applied to the right-hand capstan 10. The other capstan remains free. The tape then moves in the direction for forward play as shown in FIG. 3.

When the end of the tape is reached the tape stops. As a result of this, the switching element 46 with its pin 49 is again pivoted outwards in the clockwise direction. The connecting element 52 is pivoted anticlockwise (FIG. 2B) as indicated by the arrow 67. During this movement beyond the normal travel occurring in the latched position, the connecting element 52 performs an overtravel. This overtravel is possible because the projection 71 bears against the head-mounting plate 74 via the levers 76 and 77 against the action of the blade spring 72 and thus has room for an additional travel towards the head-mounting plate. During this overtravel the pin 65 leaves the recess 70 and the latching mechanism 57 is released. Under the influence of the spring 54 the released connecting element 52 is now pivoted clockwise, so that the projection 71 moves outwards. In this position the head-mounting plate has moved back and the guide pins 86 and 87 again egnage the run-in branches 110 and 111. The control plate 88 has remained in its previous position. The tongues 102 and 103 are still in positions which are offset to the left relative to the central position of the run-in branches 110 and 111 (FIG. 6C).

Now the automatic reversing process begins. The rotation of the switching wheel 14 continues. Since the head-mounting plate 74 has been withdrawn, its bent end portion 80 (FIGS. 3 and 4) is moved outwards, thereby pivoting the pivotal arm 16 in such a way that the switching wheel 14 is out of mesh with the play wheel 25. The play wheel 25 is then no longer driven. The detection means 40 detects tape stoppage. Again, the switching element 46 is pivoted clockwise. The switching element 46 presses against the connecting element 52 and pivots this element again anticlockwise in the direction indicated by the arrow 67. The pin 65 then travels again around the heart-shaped projection 56 and the finally engages the recess 70. Thus, the connecting element 52 is latched. The projection 71 has now moved forward again and after it has been moved forward the head-mounting plate 74 occupies the position shown in FIG. 4. Via the bent end portion 81 of the head-mounting plate 74 the gear wheel 17 comes into mesh with the gear wheel 11 and with the play wheel 24. In this position shown in FIG. 4 the pressure roller 78 is applied to the capstan 9 and the tape is driven in the reverse direction.

The reversal of the direction of tape transport is again effected by means of the guide-slot system shown in various positions in FIG. 6. The last position described in the position shown in FIG. 6C. In this position the control plate 88 has moved to the left; the guide pins 86, 87 engage the run-in branches 110 and 111. As the head-mounting plate 74 has moved forwards again, the guide pins 86 and 87 have also moved forwards and abut with the right-hand oblique surfaces of the pointed tongues 102 and 103. As a result of this, the guide pins 86 and 87 are moved to the right and can move further into the branches 108 and 107. The lateral movement of the guide pins 86 and 87 is possible owing to the shifting of the guide pins 86 and 87 in the slots 84 and 85. When they engage the branches 107 and 108 the guide pins 86 and 87 have moved the control plate 88 to the right, so that now the branches 108 and 98 as well as the branches 107 and 97 coincide with each other. This means that the tongues 102, 103 are positioned so that when they move back and forth again the guide pins can abut with the left-hand oblique surfaces of the pointed tongues 102 and 103. The position of the guide slot system is then as shown in FIG. 6D. In the short branches 107 and 97 the guide pin 87 meets a stop, which prevents the head-mounting plate 74 from being moved further to the right. At the left-hand side the guide pin 86 is free to move and it can move so far in the branches 108 and 98 that the spring 72 can urge the left-hand side of the head-mounting plate 74 with the pressure roller 78 against the capstan 9. This position is shown in FIG. 4.

It is to be noted that there is provided a track switch 265 which informs the microprocessor 224 in which direction the tape is played. The track switch 265 is actuated by a projection 266 on the head-mounting plate 74 in the position shown in FIG. 3. In the other position of the head-mounting plate 74 as shown in FIG. 4, the switch is open. The switch 265 ensures that depending on the direction of transport the correct tracks of the magnetic head 75 are operative.

Manually switching to reverse operation is readily possible during normal playing. For this purpose the latching magnet 244 is de-energised by briefly touching a control 264 and the latching lever 241 is released under the influence of the spring 54 on the connecting element 52. As a result of this, the pin 60 is tilted to the left in FIG. 8. The latching mechanism 57 is released because the pin 65 moves out of its range. As a result of this, the head-mounting plate 74 can be withdrawn. The tape-deck motor 3 is now stopped via the switch 267 until the servo motor 221 has moved the servo rod 62 up to the switch 225 and back into the play position, the switch 249 being opened again by the projection 248. During this movement the surface 246 ensures that the latching lever 241 is again applied to the latching magnet 244. The latching mechanism 57 is rendered operative again by engagement of the pin 65. The control circuit 224 then starts the tape-deck motor 3. The transport lever 52 is pivoted and the head-mounting plate 74 is moved forwards. At the same time the direction of tape transport is reversed by means of the control plate 88 as shown in FIGS. 5 and 6.

For fast winding a fast-wind touch control 268 or 269 (FIG. 8) depending on the direction, is touched which switch is electrically connected to the control circuit. The latching magnet 244 remains de-energised via the control circuit 224.

In the play position the command pin 257 remains in the starting portion 270 of the closed guideway 253. The command pin 257 has some tolerance within the starting portion 270. This tolerance can be adjusted by means of an adjusting block not shown, by means of which the projection 248 is positioned. In this way the instant of closure of the switch 249 can be adjusted. The range of variation of the position of the pin 257 is situated between the position of the pin 257 indicated by solid lines and a dashed position (FIG. 9B). It is assumed that in the range where a change-over to fast winding must be effected normal playing in the forward direction takes place. If the fast-wind touch control 268 is now actuated, the control circuit 224 controls the servo motor 221 in such a way that the servo rod 62 is moved to the right (FIGS. 8, 9A and 9B). The command pin 257 now engages the first command track 254. The drive portion 33a of the actuating rod 33 is then moved to the right until the right-hand position shown in FIG. 9B is reached. At the same time, the gear wheels shown in FIG. 1 have been positioned so that the tape is wound rapidly in the forward direction. The pins 74c, 74d have been shifted by means of the oblique surfaces 35a and 35b as a result of which the head-mounting plate 74 is moved away from the tape (FIG. 1). However, the travel of the head-mounting plate 74 is reduced, so that the switch 267 is not actuated. Fast forward winding can be terminated by touching the play touch-control 264. The servo rod 62 then moves back to the play position and the command pin 257 again reaches the starting portion 270. The spring 260 moves the actuating rod 33 to the left. The tape is then played again in the direction in which it was played previously.

If fast rewinding is required, the fast-rewind touch-control 269 is actuated. The control circuit 224 supplies a command to the servo motor 221 that it should move the servo rod 62 to the left. The command pin 257 moves past the edge 253a and thus engages the guideway 253. At this instant the switch 249 is closed again, which means that the servo motor 221 is now switched to the reverse direction by means of the control circuit 224. The command pin 257 is then forced to move further into the guideway 253 in the direction in which it travelled already, namely up to an edge 253b. As a result of this it is forced to enter the command track 255, thereby moving the drive portion 34a gradually to the right into the right-hand position shown in FIG. 9B. The various parts in FIG. 1 now have moved in a direction opposite to that for fast rewinding and the edges 36a and 36b again abut with the pins 74c and 74d, so that the head-mounting plate is withdrawn from the tape. Fast rewinding can be terminated by actuating the play touch-control 264. The command pin 257 then engages the guideway 253 until the starting portion 270 is reached while the servo rod 62 is moving back. Because of the pretension of the spring 261, the actuating rod 34 has followed the command pin 257 and has returned to the initial position. Now playing in the original playing direction starts again.

When an electrical eject touch-control 271 is actuated the latching magnet 244 is de-energised and the latching lever 241 is released. The head-mounting plate 74 is withdrawn from the tape; the switch 267 closes and the tape-deck motor is switched off. This ensures that the head is lifted off the tape, so that neither the tape nor the head can be damaged. The servo motor 221 moves the servo rod 62 fully to the left. The command pin 257 then engages the third command track 256. Moreover, the spring 235 pulls the ejector 232 against the pin 237 and thereby pivots the ejector 232 in the anticlockwise direction. As a result of this, the cassette 228 is ejected after the lift 217 has been raised, and the switch 263 opens. In order to ensure that the command pin engages the command track 256, thereby ensuring that the servo rod 62 actually travels far enough to the left, the reversing switch 249 must be disabled. Upon actuation of the eject touch-control 271 the control circuit 224 therefore sets the reversing switch 249 to a position in which it cannot give the reversing command.

What is claimed is:

1. A control mechanism for a magnetic-tape-cassette apparatus, said mechanism comprising two adjacent axially movable actuating rods for switching two different operating modes of the apparatus, a servo motor and a servo rod axially reciprocable by means of said motor, the improvement comprising a command member connected to said servo rod for movement therewith, a basically closed guideway which branches into a first and a second command track and drive portions of said actuating rods, each located in an associated command track, said command member carrying a command pin which can travel in said guideway in one predetermined direction only, said command pin as it travels in the first or the second command track driving the drive portion of a corresponding actuating rod so as to move said rod.

2. A control mechanism as claimed in claim 1, wherein said command member is a connecting rod, said command pin being located on the end of said connecting rod which is remote from said servo rod.

3. A control mechanism as claimed in claim 2 wherein the end of said connecting rod opposite said command pin is connected to an end portion of said servo rod.

4. A control mechanism as claimed in any one of claims 1 through 3 including a command block rigidly connected to said apparatus, said common tracks and said guideway being formed in said command block.

5. A control mechanism as claimed in claim 4 wherein said command block includes a hold-down means which urges said command pin into said command tracks and said guideway.

6. A control mechanism as claimed in claim 1 including a reversing switch which cooperates with the servo rod and is so arranged relative to the path of axial movement of said rod that the direction of rotation of the motor can be reversed by actuation of the switch only when said command pin has reached such a location in the guideway that it must travel through the guideway in said predetermined direction.

7. A control mechanism as claimed in claim 6 wherein said guideway comprises a starting position for the command pin from which starting position the command pin can enter the first command track directly, said command pin being able to enter the second command track only after traveling from said starting position to another position.

8. A control mechanism as claimed in claim 7 wherein said command pin is in the starting position for the apparatus to be in the play mode and said command pin has traveled through the first or the second command track for the apparatus to be in one of two fast wind modes.

9. A control mechanism as claimed in claim 7 wherein said guideway branches into a third command track disposed in line with the path of movement of the servo rod and said reversing switch is rendered inoperative when the command pin enters the third command track.

* * * * *